United States Patent

Springer

[15] 3,680,251
[45] Aug. 1, 1972

[54] INSECT ELECTROCUTOR
[72] Inventor: Charles H. Springer, Route 1, Box 327, Alta Loma, Tex. 77510
[22] Filed: June 12, 1970
[21] Appl. No.: 45,810

[52] U.S. Cl. .................................................43/112
[51] Int. Cl. ...........................................A01m 1/22
[58] Field of Search.......................................43/112

[56] References Cited

UNITED STATES PATENTS

| | | | |
|---|---|---|---|
| 2,165,560 | 7/1939 | Luther | 43/112 |
| 2,951,310 | 9/1960 | Anderson et al. | 43/112 |

FOREIGN PATENTS OR APPLICATIONS

| | | | |
|---|---|---|---|
| 285,510 | 5/1931 | Italy | 43/112 |
| 1,515,795 | 1/1968 | France | 43/112 |

*Primary Examiner*—Lucie M. Laudenslager
*Attorney*—Carlos A. Torres

[57] ABSTRACT

Two vertically spaced, electrical grids formed from a plurality of horizontally spaced, vertically extending rods are secured to each other by swivel type insulation mountings permitting the spacing and relative position between the rods forming the grids to be altered. The two grids are electrically insulated from each other and are supplied with electrical power by leads extending from a high voltage transformer. The insulating mounting of the grids permits the rods in each grid to be adjusted with respect to each other to prevent arcing from grid to grid and yet to provide maximum spacing between the two grids while still permitting arcing when insects enter the area included between the two grids. The controls and electrical power supply for the two grids are housed in a compact, weatherproof covering. An ultraviolet light supplied by the power source is disposed adjacent one of the grids to attract flying insects and the grids are encased within a screened housing to reduce shock hazard.

4 Claims, 4 Drawing Figures

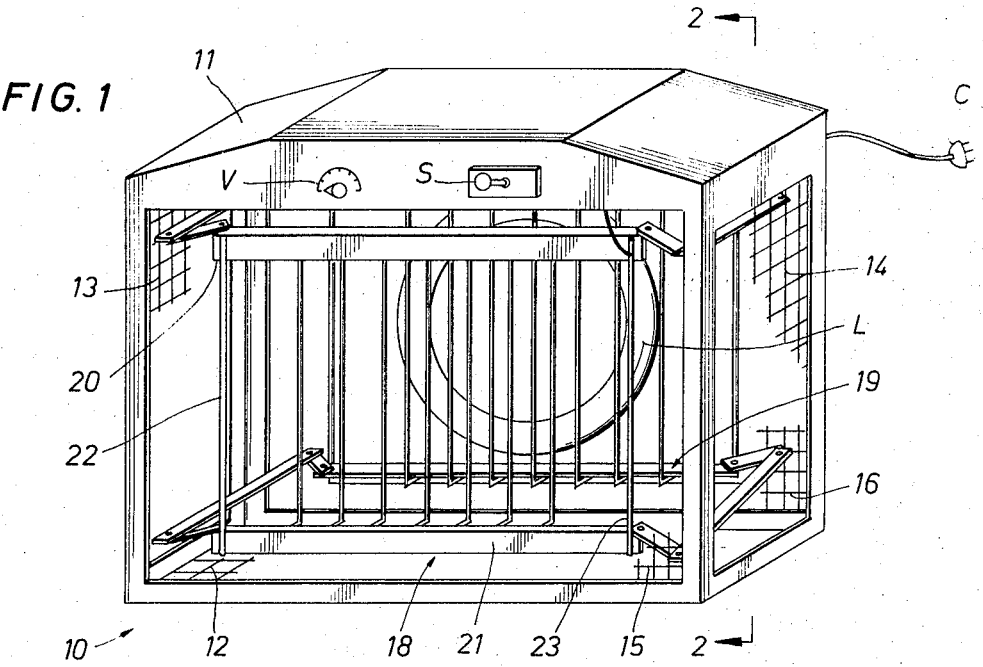
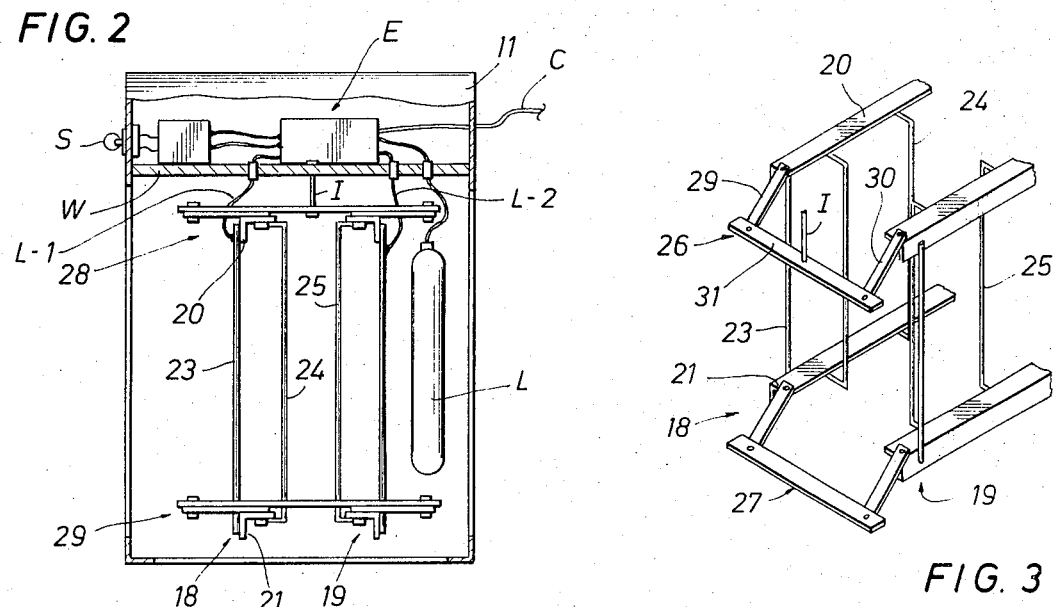
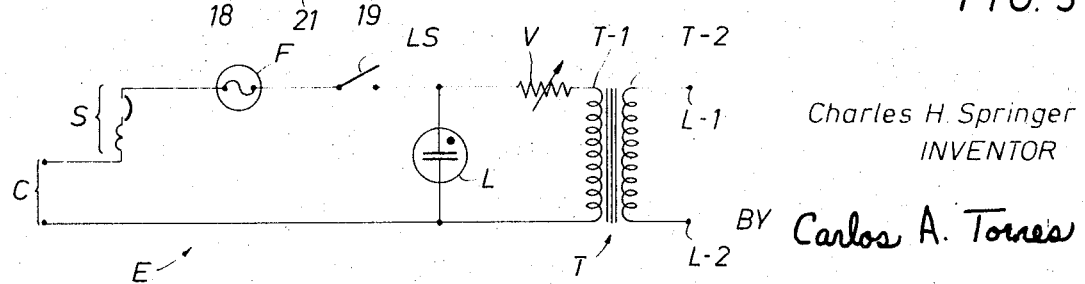

INSECT ELECTROCUTOR

BACKGROUND OF THE INVENTION

1. Field of the Invention

The present invention relates to means for killing insects. More specifically, the present invention relates to a new and improved insect electrocutor adapted to kill insects flying into the area between spaced, electrically insulated charged grids.

2. Brief Description of the Prior Art

A variety of devices have been suggested by the prior art for the purpose of electrocuting insects. In general, all of such devices include spaced grids electrically insulated from each other with an electrical potential existing across the grids. When an insect enters the space between the spaced grids, it alters the conductivity of the area included between the grids to permit conduction from one grid to the other, electrocuting the insect. One prior art teaching suggests grounding one of the space grids and charging only the inner grid to reduce the danger of accidental shocking. In general, the various conducting elements included in the prior art grids have taken on a wide variety of shapes and configurations.

The conventional grid structures employed in these prior art devices include electrically conductive elements which are fixed both with respect to similar elements in the same grid and with respect to corresponding elements in the opposite, electrically insulated grid structure. It is also conventional to employ attracting means such as an ultraviolet light in combination with the spaced, charged grids. Power for the prior art devices is normally supplied through a voltage transformer adapted to convert conventional 120 volt, 60 cps alternating current supply to a higher voltage. In setting up devices of this type, it is necessary to space the grids sufficiently away from each other to prevent arcing. The preferred adjustment is such that arcing is prevented but any change in the dielectric constant such as induced by the entrance of a very small flying insect between the spaced grids, is sufficient to induce arcing between the grids. It is well known that the conductivity of the atmosphere is affected by density and moisture content. For this reason, fixed adjustment of spacing between the two grids in conventional devices has required a compromise setting to prevent undesired arcing. As a result, the device is relatively insensitive to smaller flying insects and under some atmospheric conditions may fail to function acceptably.

Another problem associated with conventional prior art devices is shorting between the two spaced grids by the electrical path formed from the accumulations of electrocuted insects. This problem is associated with prior art grid designs which do not permit the electrocuted insect to fall freely away from the charged grid structure, thus eventually leading to accumulations of the killed insects which permits constant current flow between the grids which in turn prevents proper functioning of the apparatus. The problem is particularly acute where relatively large insects such as june bugs, locusts and the like enter between the charged grids.

Generally, as a compromise imposed by the bridging problem caused either through changes in atmospheric conditions or through the accumulation of electrocuted insects between the grids, it has not been feasible to employ relatively high potential differences between the two spaced grids. This has required a closer spacing between the two spaced grids which in turn contributes to increased danger of bridging by the accumulation of electrocuted insects and arcing during humid atmospheric conditions.

Basically, it may be seen that the prior art fails to disclose a device suitable for electrocuting flying insects which includes means for easily adjusting the spacing between the two charged grids. In addition, the prior art has locked a grid design capable of continuous operation over prolonged periods of time which permits the electrocuted insects to fall freely away from the charged screen thereby preventing undesired arcing.

SUMMARY OF THE INVENTION

The insect electrocutor of the present invention includes two spaced, vertically disposed electrically charged grids which may easily be adjusted with respect to each other to provide maximum performance under varying atmospheric conditions and to be especially adapted to different size insects. Each of the grids includes a series of vertically extending rods and in the preferred form of the invention, the rods of one grid are staggered with respect to rods of the other grid. The described construction of the apparatus of the present invention ensures electrocution of even very small insects flying between the spaced grids. In addition, even large insects electrocuted when flying through the spaced grid structure are free to fall away from the grids to prevent undesirable arcing.

The electrical circuitry of the apparatus includes a variable resistance which permits the potential difference between the two spaced grids to be altered over a wide range. This feature in combination with the adjustable spacing between the grids permits the grids to be adapted for optimum performance with both large and small insects under varying atmospheric conditions.

The electrical components of the insect electrocutor are compactly housed in a weatherproof roof structure which also serves to shield the exposed grids. The two grids are mounted with respect to each other to form a composite structure which is suspended from the top to eliminate arcing caused by the accumulation of insects falling downwardly after being electrocuted between the grids.

The foregoing and other objects and advantages of the present invention will become more apparent from the following specification and related drawings.

BRIEF DESCRIPTION OF THE DRAWINGS

FIG. 1 is a perspective view, partially broken away, illustrating the preferred form of the insect electrocutor of the present invention;

FIG. 2 is a side elevation, partially in section and partially broken away, taken along the line 2—2 of FIG. 1;

FIG. 3 is a perspective view illustrating the adjustment structure included with the spaced grids in the device illustrated in FIG. 1; and FIG. 4 is a schematic diagram illustrating the electrical circuit of the apparatus of the present invention.

DESCRIPTION OF THE PREFERRED EMBODIMENT

The preferred form of the insect electrocutor of the present invention is indicated generally at 10 in FIG. 1. The electrocutor 10 includes a housing which is equipped with a roof structure 11, a screened bottom surface 12, screened sidings 13 and 14, front 15 and rear 16. The screening on the bottom 12, sidings 13 and 14 and front and rear 15 and 16, respectively, is formed from relatively large mesh screen which permits insects to enter the electrocutor 10 but prevents humans and animals from contacting the internal charged portions of the device. The screen on the bottom 12 serves the additional function of permitting electrocuted insects to fall through the device 10 thereby preventing insect accumulations which would short out the internal components of the electrocutor.

Two horizontally spaced grids 18 and 19 and an ultraviolet florescent lamp L are suspended within the housing of the electrocutor 10. The light emitted by the lamp L functions to attrack flying insects. With reference to grid 18, which is similar in construction to grid 19, the grid structure includes upper and lower, horizontally disposed and vertically spaced L-shaped supports 20 and 21 secured to each other by means of vertically extending support rods 22 and 23. The rods 22 and 23 and brackets 20 and 21 may be welded, bolted or otherwise suitably secured together.

With reference to FIGS. 2 and 3, it may be seen that a plurality of vertically extending, U-shaped grid rods 24 extend between the two spaced supports 20 and 21. Similar elements 25 are included in the grid 19. As may best be seen by joint reference to FIGS. 1, 2 and 3, the two grids 18 and 19 are secured to each other by means of adjustable connecting structures 26, 27, 28 and 29. Connecting structure 26 which is exemplary of the other three connecting structures includes connecting arms 29 and 30 extending from the upper L-shaped supports of grids 18 and 19 respectively. The two arms 29 and 30 are connected together by an insulating bar 31. As illustrated, the arm 29 is connected to the upper L-shaped bracket 20 by means of a bolt and nut connection which permits the arm to pivot. Similar connections secure the arm 29 to the insulating bar 31 and secure the insulating bar to the arm 30 and the arm 30 to the upper L-shaped bracket of the grid 19. It will be appreciated that the connecting structures 26, 27, 28 and 29 therefore permit relatively unlimited adjustment between the two spaced grids so that the vertical grid elements 24 and 25 may be brought closely together or separated or may be staggered with respect to each other in the manner illustrated in FIGS. 1 and 3. The ability of the grids to be positioned in two dimensions with respect to each other is an important feature of the present invention since it permits large insects to enter between the grids and fall free after being killed while still permitting a spacing which ensures arcing even where small insects enter between the grids.

As illustrated in FIG. 2, the roof structure 11 houses the electrical components indicated generally at E employed to supply a controlled electrical charge to the spaced grids 18 and 19. An on-off switch control S and a variable resistance control V extend through the siding to permit external control of the electrical components housed within the roof 11. The power is supplied to the components E from a conventional source of power through a suitable electrical connector C which preferably includes a third safety connection for connecting the metal housing to ground. The electrical components E are mounted on a suitable insulating material such as wooden platform W. Electrical leads L–1 and L–2 extend through electrical insulators in the platform and attach to the spaced grids 18 and 19 to provide the desired electrical charge.

The composite grid structure formed by grids 18 and 19 is suspended from the overhead support W by means of suitable flexible insulating connectors I. The suspension members I may be any suitable flexible material having good insulating properties. The illustrated suspension permits the composite structure of grids 18 and 19 to be freely suspended so that the desired optimum adjustment between the two grids 18 and 19 may be easily effected.

With reference to FIG. 4, the electrical circuitry E of the present invention is seen to include an on-off circuit breaker overload switch S, an overlead protecting means such as the fuse F, an optional light sensitive switch LS for initiating operation of the device automatically when the external light level falls below a predetermined value, the incandescent lamp L and a variable resistance F. A conventional 110 volt, 60 cps alternating current supply may be connected to input windings T–1 of a transformer T to provide increased voltage output at the output windings T–2. In one form of the invention, the 110 volt input is transformed to 12,000 volts at the output winding to permit wide spacing between the grids. Adjustment of the variable resistance V provides control of the voltage value existing across the output windings T–2. As indicated, the voltage from the output winding T–2 is supplied to the leads L–1 and L–2 which supply the electrical potential to the space grids 18 and 19 respectively.

The switch S is preferably adapted to automatically open when the current flowing through the switch exceeds a predetermined maximum value. The switch thus functions as a safety device which automatically terminates the electrical potential between the spaced grids when unusually large loads are encountered caused for example by continuous arcing due to heavy rain. When the overload condition has been rectified, the switch S may be manually reset to reinitiate operation.

While no specific support is illustrated for mounting of the lamp L within the housing, it will be readily appreciated that any suitable means such as roof mounted brackets may be effectively employed. In addition, it will also be evident that a plurality of lamps may be employed even though a single lamp has been specifically described. It will generally be appreciated that the foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. An insect electrocutor comprising:
   a. first and second spaced grid means;

b. conducting means included in each of said grid means, and conducting means including a plurality of vertically extending rod means;
c. power supply means connected with said grid means for forming an electrical potential difference between said first and second spaced grid means;
d. connecting means for physically connecting said first and second grid means to each other;
e. electrically non-conductive material included in said connecting means for electrically separating said first and second grid means;
f. adjustment means included with said connecting means for adjusting the separation between said first and second grid means and for adjusting the relative position of said first and second grid means with respect to each other whereby said first and second grid means may be positioned in two dimensions with respect to each other;
g. movable connections formed in said connecting means for adjusting the separation and relative position between said rod means in said first grid means and said rod means in said second grid means;
h. first electrical control means for varying the potential difference existing between said first and second grid means;
i. protective screen means positioned about said grid means;
j. light means connected with said power supply means for attracting insects to said insect electrocutor;
k. two vertically spaced, upper and lower support means included in each of said first and said second grid means with said rod means in said first grid means horizontally spaced from each other and extending vertically between said upper and lower vertically spaced support means in said first grid means and said rod means in said second grid means horizontally spaced from each other and extending vertically between said vertically spaced support means in said second grid means; and
l. upper and lower arm means included in said movable connections and extending substantially horizontally from said upper and lower support means respectively with said upper arm means in said first grid means secured to said upper arm means in said second grid means by pivotable connecting means and said lower arm means in said first grid means secured to said lower arm means in said second grid means by pivotable connecting means whereby said first and second grid means may be adjusted with respect to each other. grid 2. An insect electrocutor as defined in claim 1 further including:
a. transformer means for providing a high voltage potential difference between said first and second grid means; and
b. variable resistance means for varying the output of said transformer means.

3. An insect electrocutor as defined in claim 1 further including automatic light responsive means for terminating the potential difference between said first and second grid means when said light responsive means is exposed to light intensity exceeding a predetermined maximum value.

4. An insect electrocutor as defined in claim 2 further including automatic light responsive means for terminating the potential difference between said first and second grid means when said light responsive means is exposed to light intensity exceeding a predetermined maximum value.

* * * * *